(12) United States Patent
Ramotowski

(10) Patent No.: US 8,309,625 B1
(45) Date of Patent: Nov. 13, 2012

(54) METHOD AND APPARATUS FOR PREVENTING BIOFOULING OF SURFACES

(75) Inventor: Thomas S. Ramotowski, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/159,471

(22) Filed: Jun. 14, 2011

(51) Int. Cl.
*C09D 5/16* (2006.01)
*C08K 3/34* (2006.01)
*C08K 9/04* (2006.01)

(52) U.S. Cl. ........ 523/122; 523/177; 524/236; 524/442; 524/445

(58) Field of Classification Search .......... 523/122, 523/177; 524/236, 442, 445
See application file for complete search history.

(56) References Cited

U.S. PATENT DOCUMENTS

| | | | | |
|---|---|---|---|---|
| 5,889,209 A | * | 3/1999 | Piedrahita et al. | 73/570 |
| 2008/0207581 A1 | * | 8/2008 | Whiteford et al. | 514/183 |
| 2010/0133114 A1 | * | 6/2010 | Bukshpan et al. | 205/745 |

* cited by examiner

*Primary Examiner* — Kriellion Sanders
(74) *Attorney, Agent, or Firm* — James M. Kasischke; Michael P. Stanley; Jean-Paul A. Nasser

(57) ABSTRACT

A method for preventing accumulation of organisms on a surface exposed to a marine environment. Nano-particles are provided in a water soluble polymer. The nano-particles have a thickness of about 2 nanometers and a major surface area of about 3 microns and are treated by a quaternary ammonium salt. The treated nano-particles are mixed into the water soluble polymer material. This mixture can be applied to the exposed surface. Biofouling is prevented by the sharpness of the nano-particles, sloughing of the water soluble material, and biocidal action caused by the quaternary ammonium salt.

12 Claims, 1 Drawing Sheet

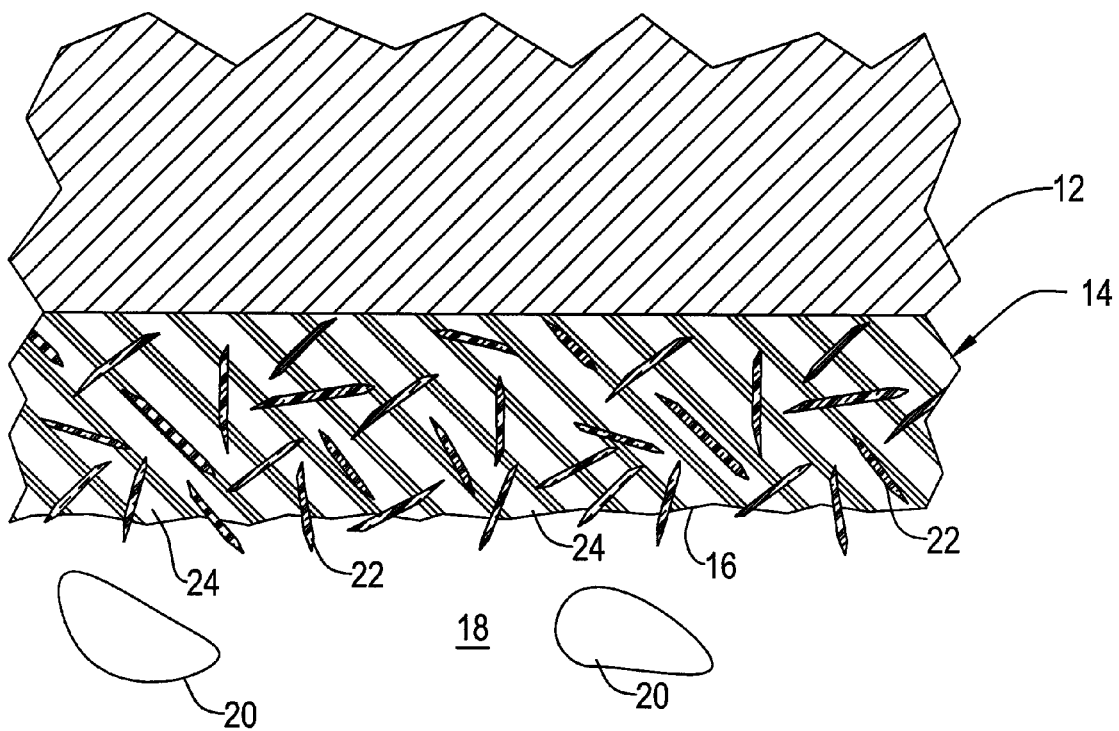

METHOD AND APPARATUS FOR PREVENTING BIOFOULING OF SURFACES

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Ramotowski, T., "Ultra-Low Permeability Polymeric Encapsulants for Acoustical Applications," Navy Case Number 95961, U.S. patent application Ser. No. 12/758,979.

BACKGROUND OF THE INVENTION (1) Field of the Invention

The present invention is directed generally to a unique kind of antifouling coating for use on marine vessels, and more specifically to an antifouling coating to prevent the accumulation of marine organisms/biomass on the submerged surfaces of marine vessels and equipment/hardware even when such objects are not moving.

(2) Description of the Prior Art

Unless protective measures are taken, any item submerged in marine waters will quickly become covered with both micro- and macroscopic fouling organisms. Biofouling of this nature is a serious concern to both the United States Navy and commercial maritime interests. This unwanted growth increases hydrodynamic drag, resulting in slower speeds and increased fuel usage. Biofouling can also interfere with the operation and performance of critical Navy systems such as SONAR equipment, underwater optical sensors and systems, special hull treatments, and any other equipment which is fully or partially submerged into bodies of water.

Each year a considerable amount of time and money is expended to groom ship and submarine hulls to remove marine biofouling. The traditional approach for the prevention of biofouling on marine vessel hulls has been to coat those hulls with a paint or coating loaded with a heavy-metal-based biocide. However the use of heavy-metal-based biocides is problematic, because such biocides do not degrade rapidly in the marine environment. This leads to the accumulation of toxic biocides in the sediment beneath many harbors and ports, which in turn can cause adverse effects on the health of non-targeted marine organisms and ecologies.

Microscopic level fouling is related to macro level fouling. Many studies have shown that if a biofilm of microbes cannot establish itself on a surface, then macro-scale fouling will not occur. Thus, it is desirable to control microscopic fouling or film formation on the surface.

Ablative technologies have been used in conjunction with some biocidal antifouling coatings to avoid the problem of a layer of organic material and dead microbes forming on and coating the surface of a hull, but typically ablation is not significant unless a vessel moves at moderate to high speeds.

The problem of microbe accumulation is particularly acute on vessels or equipment which is stationary in a marine environment (tied up at piers or docks or anchored to a fixed spot). Clearly, some kind of coating is needed that will refresh the exposed surface with biocide even if a vessel or device is not moving.

'Foul-release' technology utilizes coatings (such as silicones or highly fluorinated compounds) that exhibit low surface energy and thus present adhesion and bonding challenges for marine organisms. Since marine organisms cannot form strong bonds to such surfaces, they can be removed by the hydrodynamic forces exerted on such organisms by a vessel moving at or above a certain critical speed. However, foul release type coatings may not perform well on many vessels that tend to spend considerable time in port, or on stationary hardware, such as anchored buoys, since frequent, moderate-speed movement is needed to enable these coatings to keep hulls or other water-exposed surfaces free of fouling.

Water-soluble antifouling coatings are attractive candidates for protecting largely stationary vessels from marine biofouling. The problem with these technologies is controlling the rate of dissolution so that the coating will last for years rather than for days or months and incorporating an effective but environmentally friendly biocide within such a coating.

In view of the above problems, interest has increased in the development of more environmentally friendly technologies for preventing biofouling on ships, submarines and other maritime equipment and vessels.

SUMMARY OF THE INVENTION

It is an object of the present invention to provide an antifouling coating for use on marine vessels and equipment to prevent the accumulation of marine organisms on submerged surfaces.

It is a further object to prevent the accumulation of marine organisms on submerged surfaces even when the vessels and equipment are stationary and not moving in the water.

It is yet another object to provide a coating that will prevent the formation of a biofilm on a surface.

Accordingly, there is provided a method for preventing accumulation of organisms on a surface exposed to a marine environment. Nano-particles are provided in a water soluble polymer. The nano-particles have a thickness of about 2 nanometers and a major surface area of about 3 microns and are treated by an ion exchange process. The treated nano-particles are mixed into the water soluble polymer material. This mixture can be applied to the exposed surface. Biofouling is prevented by the sharpness of the nano-particles, sloughing of the water soluble material, and biocidal action caused by the ion exchange treatment.

The above and other objects and advantages of the present invention will become apparent from the following description, drawings and claims.

BRIEF DESCRIPTION OF THE DRAWING

The FIG. is a cross-sectional view, not to scale, of an antifouling coating on a surface in a marine environment.

DETAILED DESCRIPTION OF THE INVENTION

In the FIG., there is shown a surface 12 having a coating 14 thereon. The coating 14 has a coating surface 16 exposed to a marine environment 18. Biological organisms 20 are present in the marine environment 18. Coating 14 has treated, nano-particles 22 randomly positioned in a water soluble polymer matrix 24.

Nano-particles 22 are preferably clay nanoparticles made from phyllosilicate clay or smectite clay. Particular kinds of this clay include montmorillonite, bentonite and other 2:1 clays. Particles should have edges less than 1 nanometer in thickness. The nano-particles are formed in irregular shapes and typically have relatively large planar surfaces formed by their length and width dimensions, whereby the thickness dimension is very thin so that the preferred three-dimensional shaped nanoplatelet is sharp or jagged along its edges. The area of each particle should be about 2-3 square microns with a thickness of about 2 nanometers. They should be thick enough to be impermeable to water in their thickness direction.

Clay nano-particles 22 are treated by an ion-exchange process during which easily soluble, low charge inorganic cations naturally present between the individual platelets of a clay particle (such as $Na^+$, $K^+$ or $Ca^{+2}$) are replaced with larger, more organophilic molecules. This process makes it easier for the large polymer molecules to get in between the individual clay nanoplatelets and thereby exfoliate them into the polymer matrix.

Quaternary ammonium salts are one of the best types of molecules for use in the exfoliation of organoclay platelets such as these nano-particles 22. Such molecules are also well-known for their antimicrobial/biocidal properties. Thus, the same molecules used to exfoliate the nano-particles into the polymer matrix 24 can also serve as the primary biocide within a water-soluble antifouling coating. These biocides will discourage most organisms from settling on a surface, and kill most that do manage to settle. They are especially effective against microbes that form biofilms on surfaces and thereby enable macrofouling organisms to settle and attach to a surface.

Being ionic in nature, there would normally be some concern that these quaternary ammonium salts would be leached out of the coating by water. However, the cationic portion of the salt, i.e., the part responsible for the antimicrobial or biocidal properties, is bound to the surface of the nano-particles through the ion-exchange process, so it is not easily dissolved. As the coating slowly dissolves microbes will find it difficult to colonize on the surface of the coating due to the presence of the nano-particles, whereby fresh quaternary ammonium cations are continuously being exposed. Specific quaternary ammonium compounds that are suitable for this purpose include benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride and domiphen bromide or the like.

Nano-particles 22 can be treated by mixing the base material with these quaternary ammonium salts. The quaternary ammonium salts help exfoliate the base material into nano-particles. The mixture of base material and quaternary ammonium salts is added to the water soluble polymer. A preferred weight percentage of nano-particles in the mixture is less than about 5% by weight. In any case, nano-particles should not exceed 10% by weight of the mixture. Mixing and exfoliation can be accomplished by high shear mixing or sonification. The exfoliated nano-particles should have the dimensions described above.

As shown in the FIG., coating 14 is made up of treated nano-particles 22 in a water soluble polymer matrix 24. Water soluble polymer matrix 24 can be polyvinyl alcohol, a water soluble polyester or the like. Slow dissolution is desirable. Coating 14 can be applied to surface 12 by spraying or casting. Painting should be avoided because it creates a layered nano-particle structure that will have a lower mechanical biocide potential.

In the present invention, the rate of dissolution of a protective antifouling coating 14 is controlled in part through the incorporation of nano-particles 22 into the polymer matrix 24. Because nano-particles 22 are impermeable in their thickness direction, molecules trying to move through a particle are forced to go around it instead of through it.

Large numbers of nano-particles can be generated by mixing properly treated clay particles as described above into the water soluble polymers. Layers upon layers of impermeable nano-particles cause diffusing molecules to follow a tortuous, slow path that results in a huge reduction in permeability, sometimes by an order of magnitude or more. For non-soluble polymer matrices, the inclusion of such particles converts the polymers into superb barrier coatings that exhibit extremely low permeabilities. For soluble polymer matrices, the inclusion of such particles slows or retards dissolution, because water molecules have a difficult time getting in and around the particles to dissolve the polymer matrix. Thus, soluble polymer coatings containing nano-particles will last much longer than coatings of the same polymer containing no such particles.

The dissolution of the antifouling coating should be relatively uniform, and should proceed from the outer surface inward with a minimum of swelling, since the particles will impede the diffusion of water into the interior of the coating 14.

Microbes 20 will try to settle and attach themselves to the coating surface 16 of the coating layer 14. One or more coats of antifouling coating can be applied to the hull 12 of the marine vessel or hardware. Preferably, multiple coats will provide long-lasting protection.

As applied, coating surface 16 of the antifouling coating 14 includes exposed nano-particles 22 which appear as studs or jagged protrusions along the coating surface 16, making it difficult for the microbes or marine organisms 20 in the environmental water 18 to settle or adhere to the coating surface 16. The cation portions of the quaternary ammonium salts which are bound to nano-particle 22 surfaces are toxic or biocidal to the microbes 20, thus preventing marine organisms 20 from attaching to the surface and killing any organisms 20 that do manage to settle on the surface 16.

Environmental water 18 is continuously dissolving away the exposed coating surface 16 of the antifouling layer 14. This continuous dissolution makes it difficult for marine organisms 20 to remain attached or get a strong foothold to the surface 16. Even if a microbe 20 does attach to the surface 16, eventually the coating surface 16 will dissolve out from underneath the microbe and the microbe will be released back into the water 18. This same mechanism also removes organic matter and dead microbes from the surface of the coating 14, thereby preventing the formation of a film or biofilm which is the first step necessary for the colonization of the surface by macrofouling organisms.

The rate of dissolution of the coating surface 16 can be controlled by changing the concentration of nano-particles 22 in the polymer 24. As the concentration of nano-particles 22 increases, the dissolution rate decreases. The dissolution rate can also be changed by varying the particular water soluble polymers used.

This invention represents a practical and affordable option for a useful, soluble, antifouling coating for marine vessels and equipment. It exhibits several advantages over presently used antifouling coatings. The fact that the polymer matrix of the coating is a soluble polymer means that fresh biocidal surfaces are constantly being exposed as the polymer matrix dissolves. The dissolution of the matrix also serves to undermine and therefore dislodge any macroscopic organisms (alive or dead) that happen to gain a foothold on the surface, thereby preventing the formation of detritus layers or biofilms. Because the polymer matrix is soluble, it will continue to dissolve even when a vessel, equipment or hardware is stationary, as when docked at a port, or anchored such as a buoy. This is a significant advantage over the conventional ablative antifouling paints that are capable of refreshing their active surfaces only if a vessel moves at a fairly high speed. The nanoclay platelets greatly slow the normal dissolution rate of the polymer matrix, thereby allowing the antifouling coatings to last months or even years, depending upon the thickness of the coating applied to a surface and the weight percent of nano-particles added. It is also possible to modify the amount of nano-particles added to the coating to make a given coating last for a predetermined, desired period of time. Because the coating itself is soluble, it will be easier to remove when the time comes for a fresh coating to be applied than currently-used antifouling paints and coatings that are based upon non-soluble polymer matrices.

The active biocidal ingredient, quaternary ammonium salts, is more environmentally friendly than the presently-used heavy metal-based biocides. Furthermore, the quaternary ammonium cation is attached to the clay particles, so they tend to remain attached to the surface of the platelets, rather than being quickly leached out of the antifouling coating by water. Clay nano-particles and quaternary ammonium salts are inexpensive, and even after the ion-exchange treatment, the resulting clay additive is fairly inexpensive.

It is understood that many modifications and variations are possible in light of the above teaching. Such modifications and variations that may be apparent to a person skilled in the art are intended to be included within the scope of this invention as defined by the accompanying claims.

What is claimed is:

1. A method for preventing accumulation of organisms on a surface exposed to a marine environment comprising the steps of:
   providing phyllosilicate nano-particles having a thickness of about 2 nanometers and a major surface area of about between 2 and 3 square microns;
   treating the provided nano-particles with a quaternary ammonium salt;
   providing a water soluble polymer material;
   mixing said treated nano-particles into said water soluble polymer material; and
   applying said water soluble polymer material and treated nano-particle mixture to the surface without aligning said treated nano-particles.

2. The method of claim 1 wherein the nano-particles are made from a natural clay material.

3. The method of claim 1 wherein the water soluble polymer material comprises a selected one of a polyvinyl alcohol, a water soluble polyester and a combination thereof.

4. The method of claim 1 wherein the step of applying comprises casting said water soluble polymer material and treated nano-particle mixture onto the surface.

5. The method of claim 1 wherein the step of applying comprises spraying said water soluble polymer material and treated nano-particle mixture onto the surface.

6. The method of claim 1 wherein the step of mixing comprises high shear mixing of said treated nano-particles into said water soluble polymer.

7. The method of claim 1 wherein the step of mixing further comprises applying sonification.

8. A biocidal coating for a surface comprising:
   a plurality of phyllosilicate nano-particles having a thickness of about 2 nanometers and a major surface area of about between 2 and 3 square microns treated by an organophilic quaternary ammonium salt in order to exfoliate said nano-particles; and
   a water soluble polymer having said plurality of nano-particles mixed randomly therein and therethrough wherein said coating is applied to the surface in such a manner as to preserve the random orientation of said plurality of nano-particles therein.

9. The coating of claim 8 wherein the coating is applied to the surface by spraying.

10. The coating of claim 8 wherein the coating is applied to the surface by casting.

11. The coating of claim 8 wherein the nano-particles are made from a natural clay material.

12. The coating of claim 8 wherein the water soluble polymer material comprises a selected one of a polyvinyl alcohol, a water soluble polyester and a combination thereof.

* * * * *